June 23, 1925. 1,542,883
F. HOLDEN
METER
Filed Feb. 27, 1922 3 Sheets-Sheet 1

Inventor
F. Holden,
By Marks&Clerk
Attys.

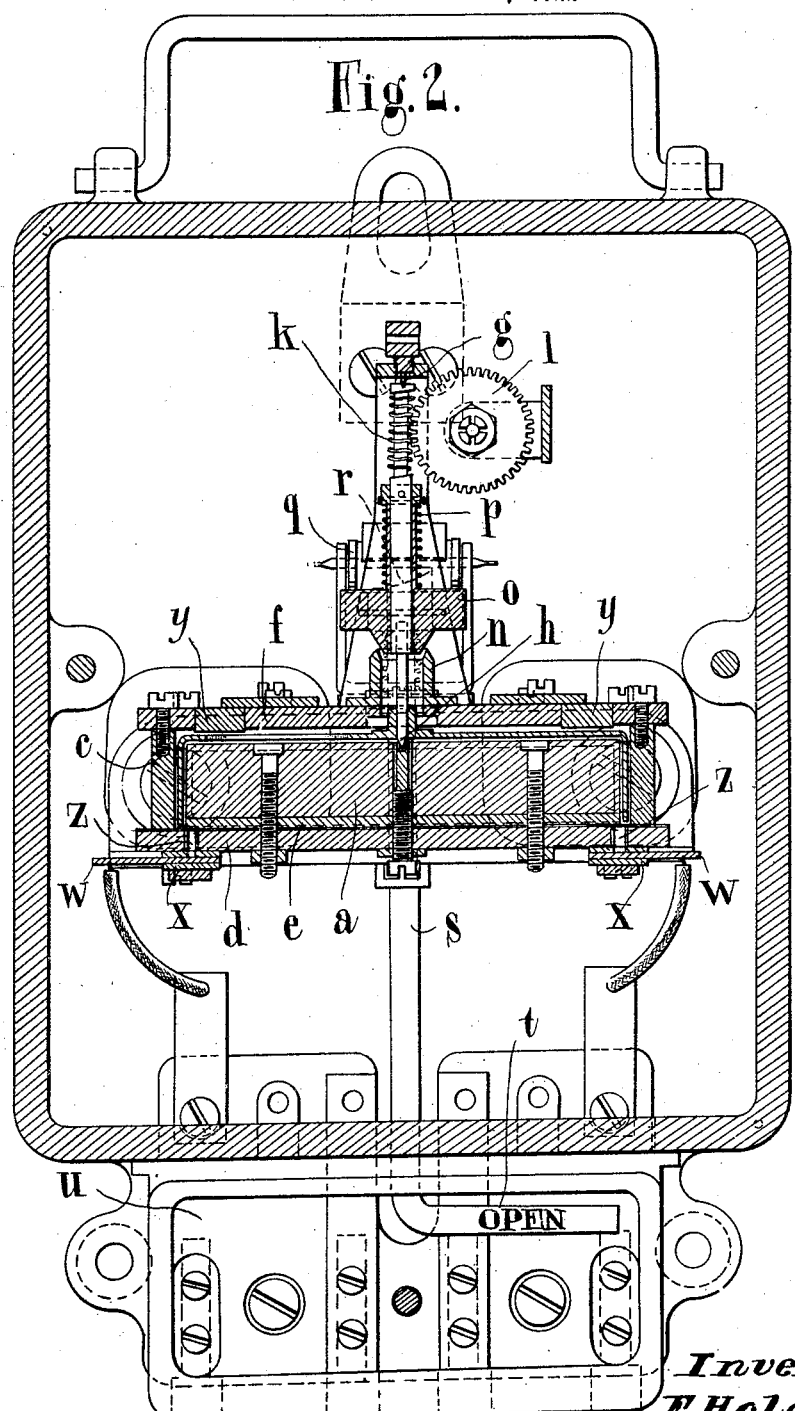

June 23, 1925.  
F. HOLDEN  
METER  
Filed Feb. 27, 1922   3 Sheets-Sheet 3
1,542,883
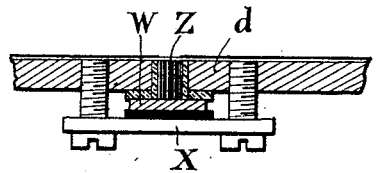
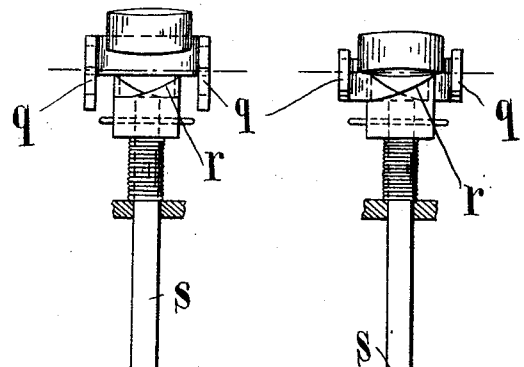
CLOSED
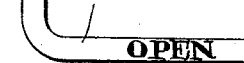
OPEN
Inventor  
F. Holden,  
By Marks & Clerk  
Attys.

Patented June 23, 1925.

1,542,883

UNITED STATES PATENT OFFICE.

FRANK HOLDEN, OF HAMPSTEAD-LONDON, ENGLAND, ASSIGNOR OF ONE-THIRD TO MEASUREMENT, LIMITED, OF LONDON, ENGLAND, AND ONE-THIRD TO LA COMPAGNIE POUR LA FABRICATION DES COMPTEURS ET MATÉRIEL D'USINES A'GAZ, OF PARIS, FRANCE.

METER.

Application filed February 27, 1922. Serial No. 539,587.

*To all whom it may concern:*

Be it known that I, FRANK HOLDEN, a citizen of the United States of America, and residing at 34, Frognal, Hampstead, London, N. W. 3, England, have invented certain new and useful Improvements in Meters, of which the following is a specification.

This invention relates to electric measuring instruments or meters, with particular reference to meters of the mercury motor type.

Meters of this type as hitherto constructed usually comprise a bell or disc armature of conducting material partially or wholly submerged in a bath of mercury and rotating in a magnetic field. In the case of a bell-shaped armature a cylindrical core of magnetic material is arranged within the bell and magnetic pole pieces secured to the ends of the limbs of a permanent magnet are mounted in close proximity to the outer periphery of the bell, the magnetic circuit being completed between the poles of the permanent magnet by means of the core located within the bell. The current to be measured is passed through the mercury and bell in the mercury cup and the interaction between this copper bell and the magnetic field causes the bell to rotate, the rotation of the bell being transmitted through a train of wheels to any suitable form of indicating mechanism.

The object of the present invention is to provide an improved construction of electricity meter of the above type which will be simple and cheap to construct, compact in compass and easy to instal, and which will also be of a high order of sensitivity and capable of giving very accurate results.

The invention consists in an electricity meter of the type referred to in which the poles of the magnet are located within the mercury cup.

The invention also consists in an electricity meter of the type referred to and having a bell-shaped armature in which the poles of the permanent magnet are located within the bell.

The invention also consists in an electricity meter of the above character, in which the magnetic circuit is completed by a ring of magnetic material forming a wall of the mercury cup.

The invention also consists in an electricity meter of the type referred to, comprising a bell-shaped armature, a permanent magnet arranged within the bell, a ring of magnetic material surrounding said bell and upper and lower plates secured to said ring to form the mercury cup.

The invention also comprises other details and arrangements hereinafter described or indicated.

The accompanying drawings illustrate one mode of carrying out the invention.

Figure 2 is a front sectional elevation, and

Figures 3 and 4 are views illustrating a detail.

Fig. 5 is an enlarged fragmentary sectional detail of the plate and terminal structure.

Figure 1:
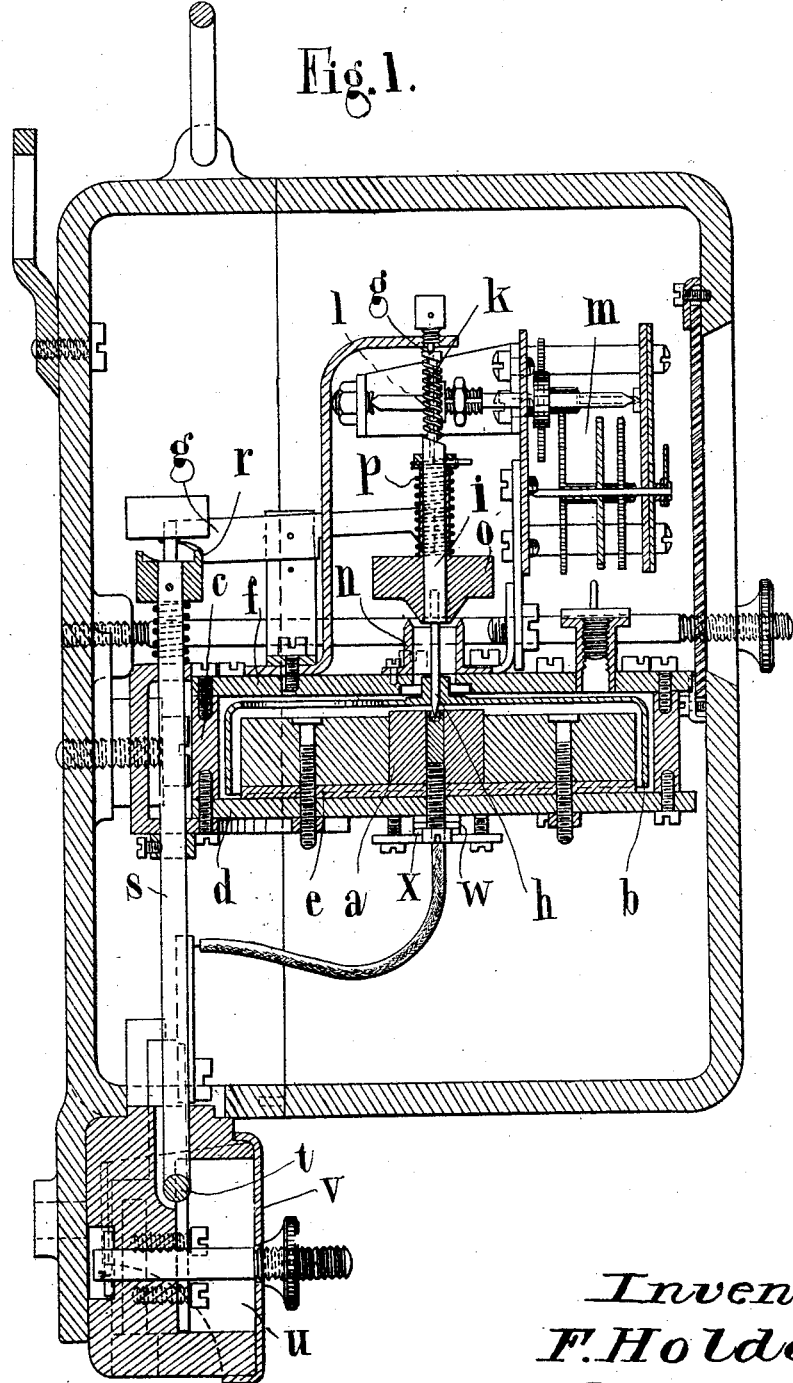
Figure 1 is a side sectional elevation showing one convenient form of meter constructed in accordance with the invention.

In carrying my invention into effect in one convenient manner, I provide a permanent magnet $a$ embedded in insulation $a'$ and made of cobalt steel or other suitable metal of high retentiveness, so that it may therefore be made of suitably small dimensions and consequently located wholly within the bell $b$, the external magnetic circuit being completed by a ring $c$ of soft iron or other good magnetic material which is adapted to surround the bell. The permanent magnet $a$ is secured to a base plate $d$ from which it is suitably insulated by insulation $e$ and the said base plate $d$ with an upper plate $f$ are secured to the lower and upper edges respectively of the ring $c$ in such manner that they form a closed vessel which is adapted to be filled with mercury and forms the mercury cup for the meter.

The bell $b$ is carried by upper and lower jewelled or other bearings $g$, $h$, so that it may rotate freely by reason of the torque set up by the interaction of the copper bell and the magnetic field, and it will be understood that the ends of the permanent magnet $a$ are preferably formed concentric with the outer ring $c$ and that there is sufficient clearance space between the poles of the magnet and the outer ring to permit of the free rotation of the bell, the various surfaces being insulated by means of paper, shellac varnish or other suitable means.

The spindle *i* carrying the bell is operatively connected (for example, by means of the worm *k* and worm wheel *l*) with an integrating mechanism *m* of any usual or desired form and in order that the apparatus may be safely transmitted from place to place, while at the same time being ready for immediate installation and use, I prefer to provide means whereby the mercury cup may be sealed at that point where the spindle *i* passes therethrough, in order to prevent the escape of the mercury. For this purpose the upper plate *f* may carry a sleeve *n* surrounding the spindle *i* and forming a seating for a sealing cup *o* which is adapted normally to be held in its open position by means of a spring *p* but to be moved into its closed position to seal the cup by means of a pivoted lever or other device *q* actuated by a cam *r* adapted to be rotated by a suitable arm or lever *s* the end *t* of which, for example, may be located in a chamber *u* formed in the lower part of the meter and to which access may be obtained by the removal of a cover *v* which, when the meter is ready for installation, may be sealed in any usual or approved manner.

The lever, or the chamber in which the same is located, may be provided with the words "Open" and "Closed" suitably located, or may have any other convenient indication by inspection of which it may at once be ascertained whether the meter is in condition for transit or for installation and use as a meter.

In the example shown the end *t* of the lever *s* is provided with the necessary indications, as shown in Figures 3 and 4. The integrating mechanism *m* may be carried as shown from the upper plate *f* or it may be located in any other convenient position.

In order to simplify the arrangements permitting of the current to be measured being conducted to the mercury within the mercury cup I provide two copper plates or other suitable conductors *w* which are clamped externally (preferably upon the under side) on the mercury cup by means of suitable clamping plates *x* and screws or other means, whereby apertures *z* in the mercury cup are closed in a liquid-tight manner while at the same time the mercury in the cup makes good contact with the conductors by reason of its having access thereto through the apertures *z*. The current to be measured is conducted to these contact plates *w* and it will be obvious that this arrangement eliminates the necessity for the usual leads or conductors which are passed into the mercury within the cup and for the liquid-tight arrangements which must be provided in conjuction therewith.

In the upper side of the mercury cup and opposite to or approximately opposite to the contacts *w* upon the lower side, I provide two copper plugs *y* (Figure 2) amalgamated on their lower surfaces or other suitable conducting elements which are connected by a low resistance conductor and in contact with the mercury within the cup so that by these means the current passing through the mercury is localized and its intensity thereby increased, with corresponding increase in the torque exerted and consequent increased sensitivity of the instrument as a whole.

It is to be noted with regard to the copper plugs *y* and the conductor connecting the same that the upper plate *f* in the present case forms the conductor; in actual practice the under surface of the plugs *y* stands slightly proud of the under surface of the plate *f* and such under surface of the plate is covered with a layer of insulating varnish so that the points of contact with the mercury in the mercury chamber are localized on the plugs *y*.

A meter constructed and arranged in accordance with the foregoing description will be very compact in compass, simple and cheap to make and efficient and constant in operation.

Further, by making the cross-section of the magnetic ring *c* of suitable area its reluctance may be practically zero, and with the permanent magnet arranged diametrically across the interior of the ring the reluctance of the whole magnetic circuit can be reduced to a minimum.

Having now described my invention what I claim as new and desire to secure by Letters Patent is:—

1. An electricity meter of the mercury motor type comprising in combination a mercury chamber formed from upper and lower plates clamped to a ring of magnetic material, a bell armature within said chamber, a permanent magnet within said bell, and conductors clamped upon one of said plates and adapted to make contact with the mercury through apertures in said plate.

2. An electricity meter according to claim 1 in which two conductors are arranged in the second of said plates opposite the contacts, said conductors being connected by a low resistance conductor and being in contact with the mercury within the mercury chamber.

3. An electricity meter of the mercury motor type comprising in combination a mercury chamber, a bell armature within said chamber, a permanent magnet within said bell, and conductors wholly external to said mercury chamber but adapted to make contact with the mercury through apertures in the wall of said chamber.

4. An electricity meter of the mercury motor type comprising in combination a mercury chamber formed of upper and lower plates secured to an intermediate ring of magnetic material, a bell armature within said chamber, a permanent magnet within said bell and conductors clamped upon the outside of the lower plate and adapted to make contact with the mercury through apertures in said plate thus forming terminals by which the current to be measured may be led to the mercury.

5. An electricity meter of the mercury motor type comprising in combination a mercury chamber formed of upper and lower plates secured to an intermediate ring of magnetic material, a bell armature within said chamber, a permanent magnet within said bell conductors clamped upon the exterior of the lower plate and adapted to make contact with the mercury through apertures in the wall thereof and sealing means for the mercury chamber carried upon the upper plate.

6. An electricity meter according to claim 4 in which two conductors are arranged in the upper plate opposite the contacts of the lower plate, said conductors being connected by a low resistance conductor and being in contact with the mercury within the mercury chamber.

7. An electricity meter according to claim 5 in which two conductors are arranged in the upper plate opposite the contacts of the lower plate, said conductors being connected by a low resistance conductor and being in contact with the mercury within the mercury chamber.

In testimony whereof I have signed my name to this specification.

FRANK HOLDEN.